Dec. 7, 1965     T. A. INSOLIO     3,222,156
APPARATUS FOR DRAWING GLASS SHEET WITH CONTROL DEVICE
Filed June 20, 1962     7 Sheets-Sheet 1

INVENTOR.
Thomas A. Insolio
BY
HIS ATTORNEYS

Dec. 7, 1965 T. A. INSOLIO 3,222,156
APPARATUS FOR DRAWING GLASS SHEET WITH CONTROL DEVICE
Filed June 20, 1962 7 Sheets-Sheet 2

INVENTOR.
Thomas A. Insolio
BY
HIS ATTORNEYS

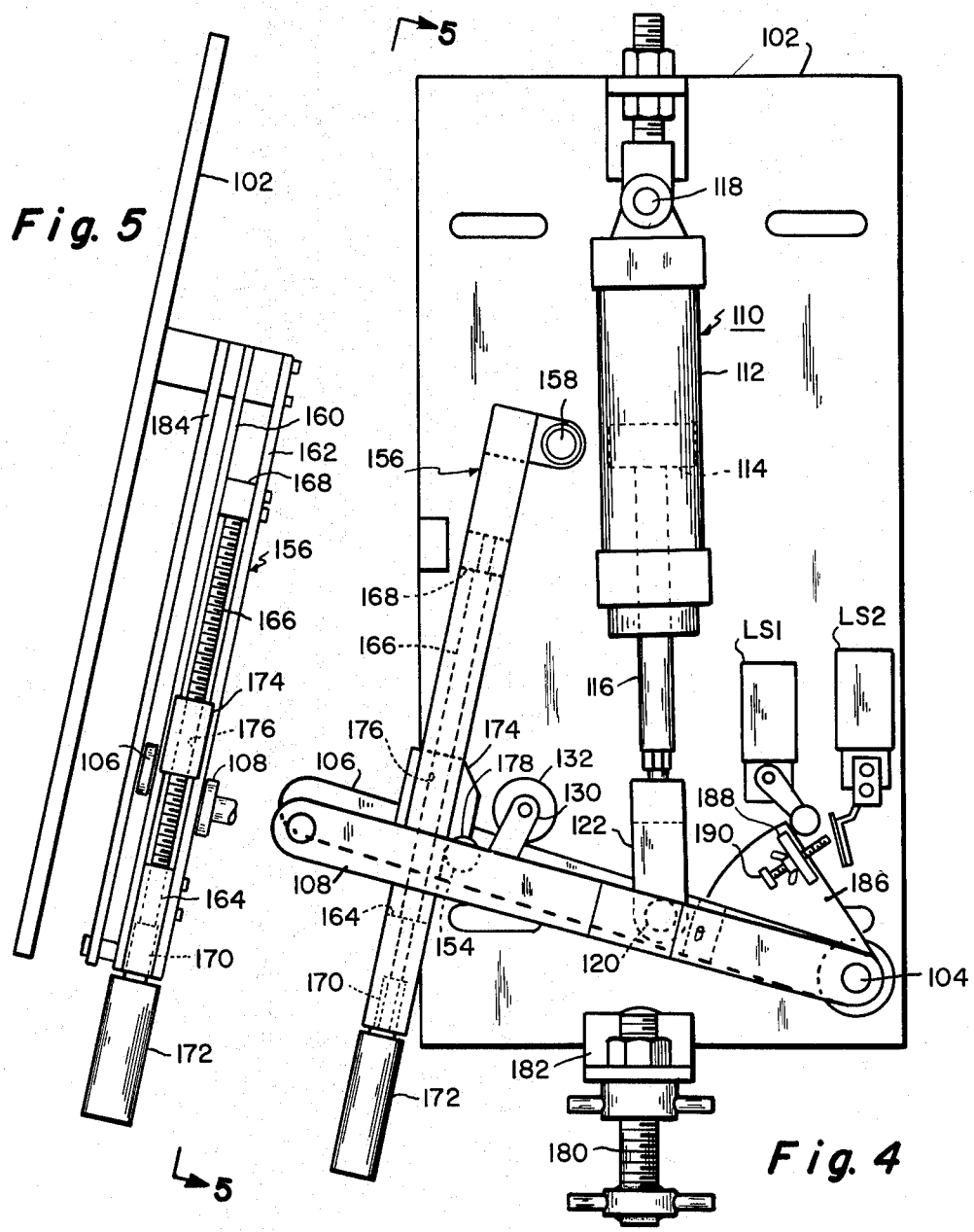

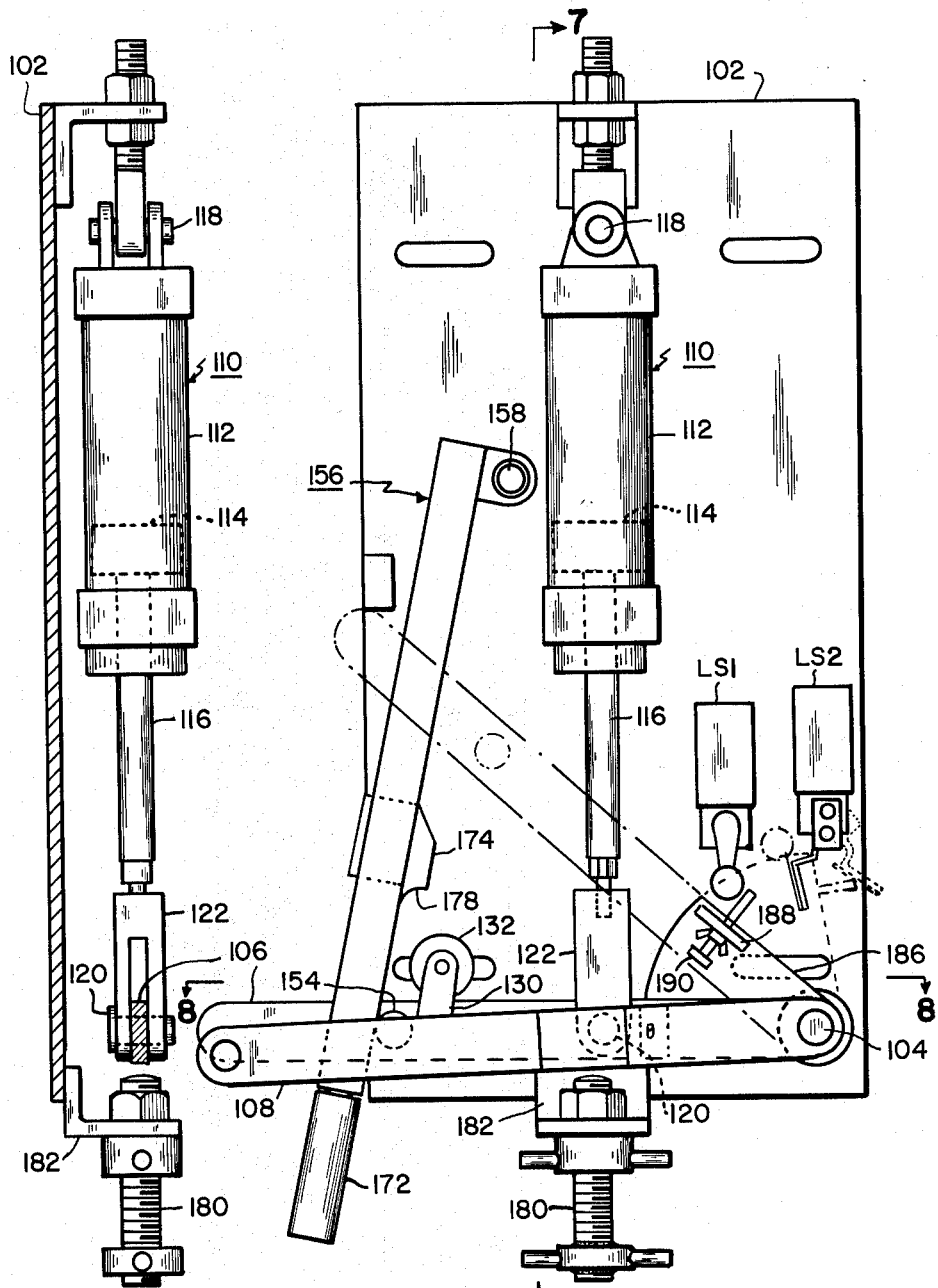

Dec. 7, 1965   T. A. INSOLIO   3,222,156
APPARATUS FOR DRAWING GLASS SHEET WITH CONTROL DEVICE
Filed June 20, 1962   7 Sheets-Sheet 5

INVENTOR.
Thomas A. Insolio
BY
HIS ATTORNEYS

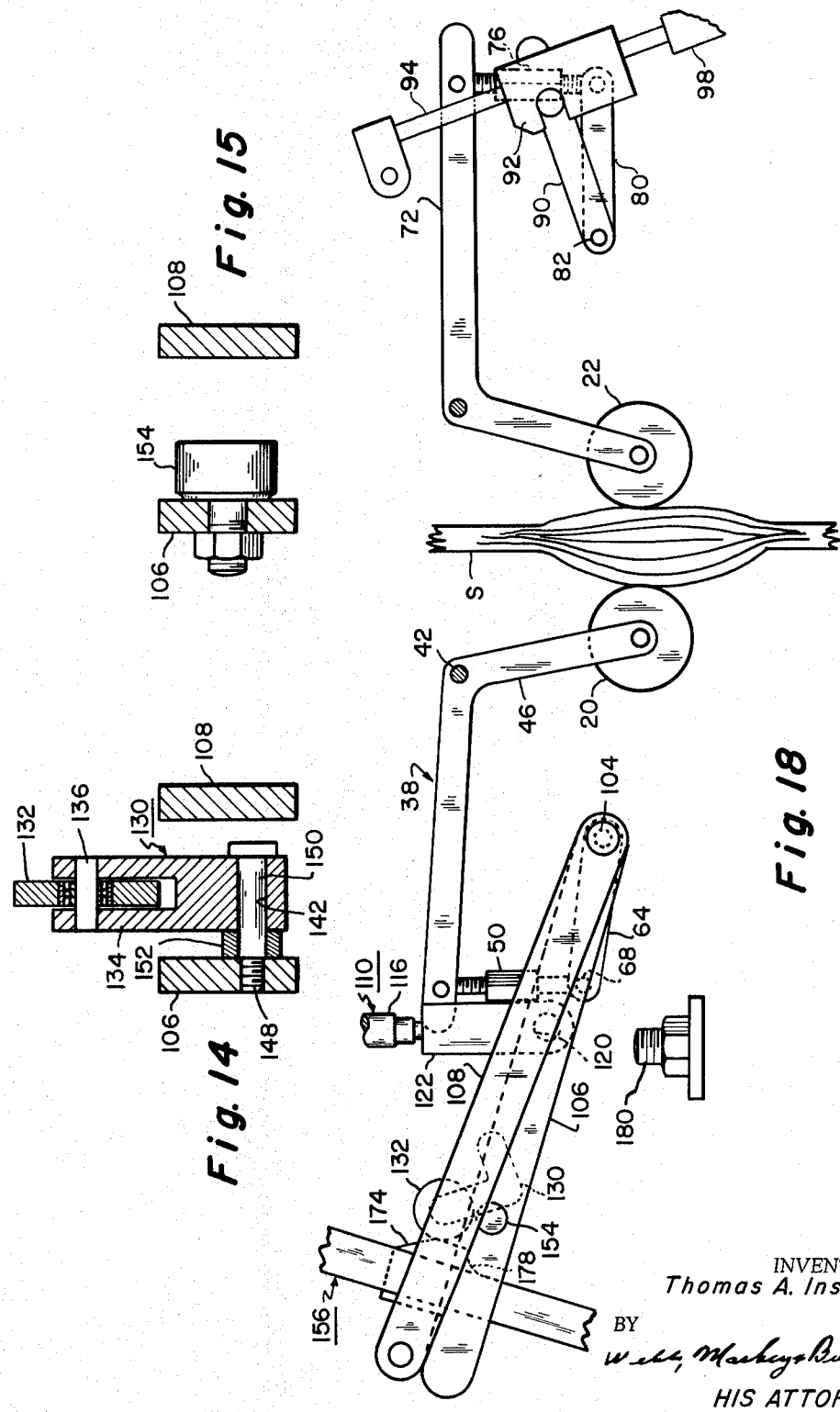

Dec. 7, 1965     T. A. INSOLIO     3,222,156
APPARATUS FOR DRAWING GLASS SHEET WITH CONTROL DEVICE
Filed June 20, 1962     7 Sheets-Sheet 7

INVENTOR.
Thomas A. Insolio
BY
HIS ATTORNEYS

United States Patent Office 3,222,156
Patented Dec. 7, 1965

3,222,156
APPARATUS FOR DRAWING GLASS SHEET
WITH CONTROL DEVICE
Thomas A. Insolio, Jeannette, Pa., assignor to American-Saint Gobain Corporation, Kingsport, Tenn., a corporation of Delaware
Filed June 20, 1962, Ser. No. 203,786
6 Claims. (Cl. 65—159)

This invention relates to a control device and more particularly to a control device for controlling the position of a drawing roll.

My control device will be described in conjunction with the Fourcault process of making sheet glass. It should be understood, however, that my control device may be used with any vertical glass drawing process wherein sets of rolls propel the glass sheet vertically.

In the Fourcault process, molten glass flows from a melting furnace through a canal into a drawing pit. A drawing machine is arranged to draw a sheet of glass upwardly from the molten bath of glass continuously fed to the drawing pit. The molten glass flows or wells upwardly through a slot in a debiteuse and is drawn vertically through the drawing pit and a vertical cooling lehr by means of mechanically driven drawing rolls in the lehr.

The drawing operation for the glass sheet is initiated by means of a bait lowered by a cable between the sets of drawing rolls and through the slot in the debiteuse into the molten bath. The drawing rolls are spaced apart for this operation. The bait with a large bulb of molten glass adhering thereto is pulled upwardly between the drawing rolls. As the glass passes between each pair of rolls, these rolls grip the sheet and continuously draw it from the molten bath. The rolls in the cooling lehr are mechanically connected to a common drive mechanism and are driven at the same speed. Normally, all the rolls above the first set of rolls are in continuous contact with the glass sheet as it moves upwardly and serve as the upward propelling mechanism for the glass sheet. During the start-up operation, the first rolls are closed to assist in moving the glass sheet upwardly through the cooling lehr.

The first rolls, which are the lowermost rolls, are also mechanically connected to the common roll driving mechanism and are rotating at the same speed as the other pairs of rolls in the lehr. The first rolls, however, because of their relative position adjacent the drawing pit, are employed only at the beginning of the drawing operation or when certain malfunctions in the glass drawing operation arise. The glass sheet as it moves upwardly between the first rolls is at an elevated temperature and is in a soft, semimolten state. The first rolls, therefore, are maintained in spaced relation with the glass sheet during the drawing operation so that they do not mark the sheet as it passes therebetween. The first rolls, however, must be maintained in close proximity with the glass sheet, otherwise if the first rolls were spaced a substantial distance from the glass sheet, a stack or chimney effect would occur and cause upward drafts of hot air. The chimney or stack effect may cause annealing defects or warpage such that the glass is not commercially acceptable. The speed at which the glass sheet is drawn from the molten bath of glass determines the number of rolls that are maintained in spaced relation with the glass sheet. It has been found when the drawing speed is increased beyond a predetermined speed, the glass is soft as it passes between the second set of rolls and the second set of rolls will mark the glass sheet. The description herein is restricted to a control device for the first set of rolls, but my control device may be employed with equal facility on additional sets of rolls as required.

In the glass drawing operation there are instances when the glass will slip between the rolls and will buckle or weave in in the lehr and drawing pit. It is extremely important that the first rolls be closed as soon as this malfunction occurs so that the first rolls can then apply added drawing power to the glass sheet and permit the continuous drawing operation to continue. The operator can remedy the malfunction and then manually open the first rolls.

There are also instances in the glass drawing operation where stones or foreign particles are carried vertically with the sheet of glass. The stones cause an increased thickness to the glass sheet and the rolls must be capable of permitting the stone or the portion of the glass sheet with an increased dimension to pass therebetween. Several problems are encountered in providing a control device for positioning the first rolls. The control device must be capable of closing the first rolls when a malfunction is detected. The first rolls must also be maintained at a predetermined distance from the glass sheet during the normal drawing operation to minimize or eliminate the above discussed stack effect. The control device must also be able to permit the roll to move with the sheet of glass in the event a stone is present or there is an increase in the glass thickness. It is highly desirable to provide a control device which will permit the rolls to close either by their own weight or otherwise when there is a loss of air pressure, or when a malfunction in the control circuitry occurs.

Briefly, my control device includes a pair of control arms connected to a control shaft which positions the roll relative to the glass sheet. One of the control arms is fixed to the control shaft and the other control arm is free to rotate relative to the control shaft. The power means to open and close the roll is secured to the control arm which rotates on the control shaft. A link connects the two control arms to each other and a stop means is provided to limit the movement of the roll relative to the glass sheet. A release means is also included which disengages the stop means to permit the roll to open wider in the event the thickness of the glass sheet or a stone urges the roll outwardly from its normal predetermined spaced position from the glass sheet. The power means of my control device can also be actuated to close the roll in the event a malfunction occurs. The control arms and shafts of the control device are so arranged that if a power failure occurs, or there is a loss of air pressure to maintain the roll in an open position, the roll will move by its own weight against the glass sheet. It will hereinafter become apparent how my control device solves the above discussed problems in a novel manner with a minimum number of elements.

The apparatus which comprises this invention accomplishes the foregoing and other functions in a novel way, as will now be explained. Further features, objects and advantages will either be specifically pointed out or become apparent when, for a better understanding of the invention, reference is made to the following written description, taken in conjunction with the accompanying drawings which form a part hereof, and in which:

FIGURE 4 is a view in front elevation of my control device when the rolls are in a normal operating position.

FIGURE 5 is a view in side elevation taken along the line 5—5 of FIGURE 4 illustrating certain details of my control device.

FIGURE 6 is a view similar to FIGURE 5 illustrating the relative position of my control device when the rolls are closed and are against the glass sheet.

FIGURE 7 is a view taken along the line 7—7 of FIGURE 6 illustrating the power means for opening and closing the rolls.

FIGURE 14 is a view in section taken along the line 14—14 in FIGURE 10 illustrating the release means connected to the link and the link connected to one of the control arms.

FIGURE 15 is a view in section taken along the line 15—15 of FIGURE 10 illustrating the cam follower secured to one of the control arms.

FIGURE 18 is a view similar to FIGURES 16 and 17 illustrating schematically my control device when a stone or glass sheet of increased thickness passes between the rolls.

Figure 1:
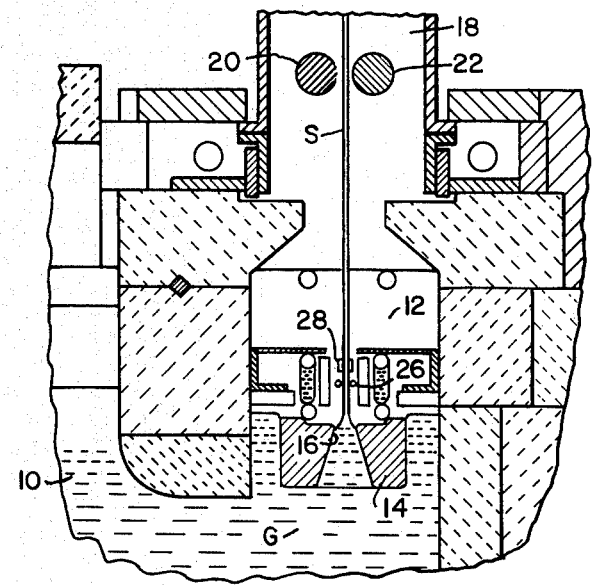
FIGURE 1 is a fragmentary sectional view in end elevation of a drawing pit and a portion of the cooling lehr illustrating the relative position of the first roll.
Figure 2:
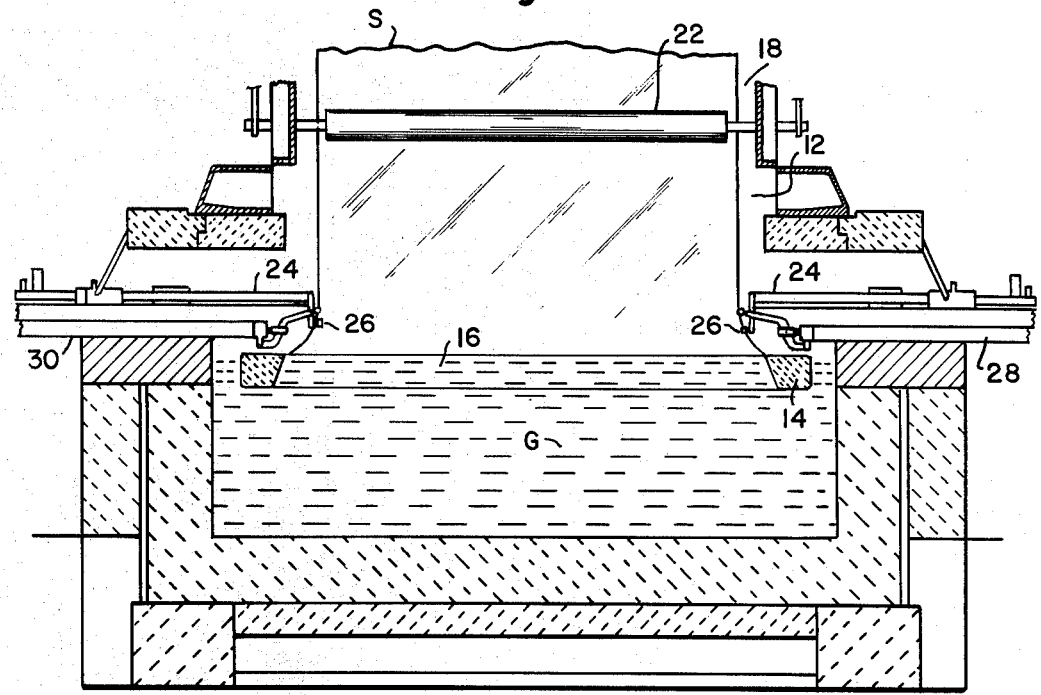
FIGURE 2 is another fragmentary sectional view in side elevation of the drawing pit illustrating the relative position of the first rolls.
Figure 3:
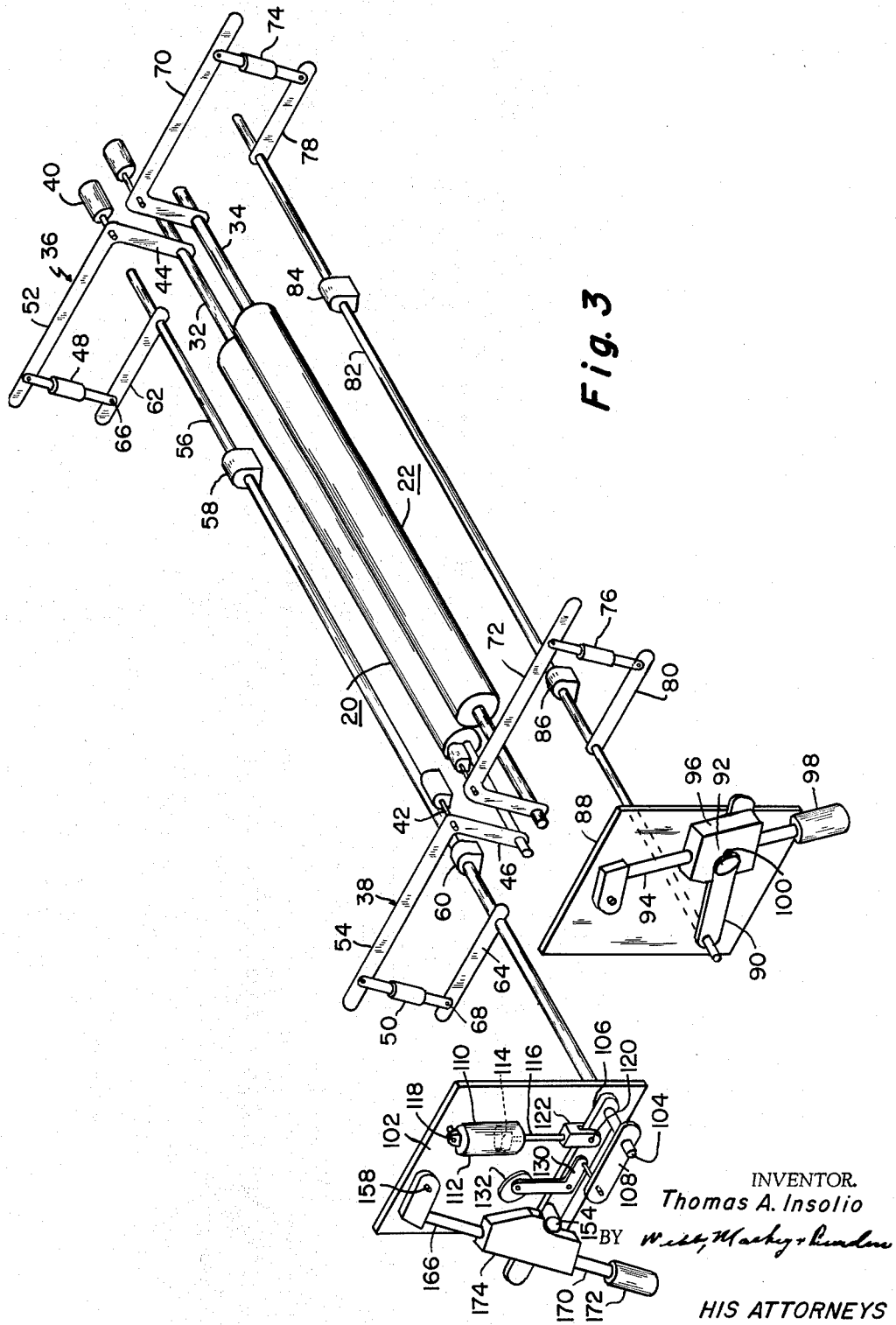
FIGURE 3 is a fragmentary perspective view illustrating the first rolls, the supporting arrangement, and my new control device for the pair of rolls.
Figure 8:
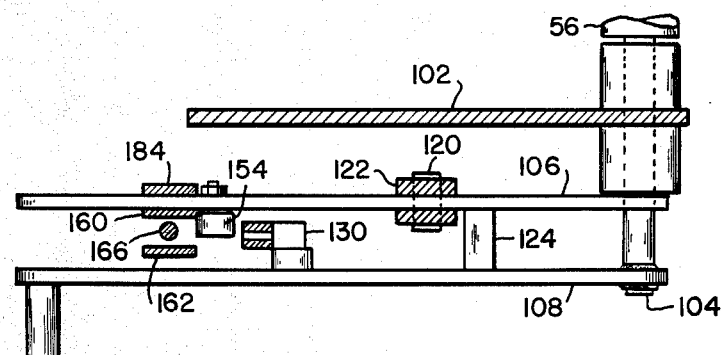
FIGURE 8 is a view in top plan and section taken along the line 8—8 of FIGURE 6.
Figure 9:
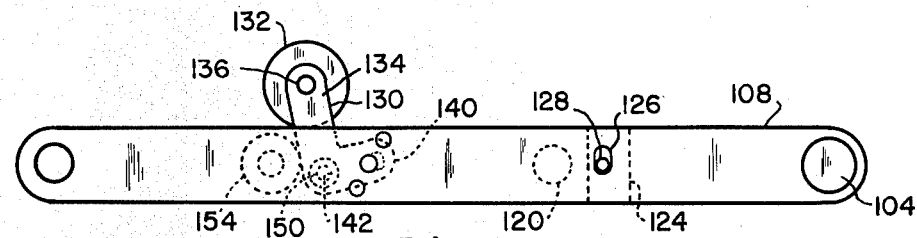
FIGURE 9 is a view in elevation of a control arm and associated mechanism of my control device.
Figure 10:
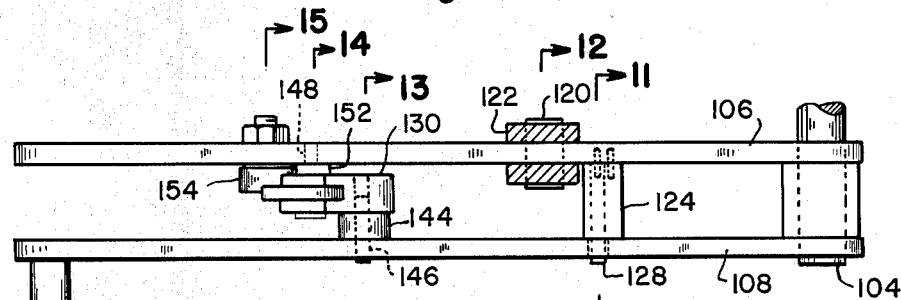
FIGURE 10 is a top plan view of the mechanism illustrated in FIGURE 9.
Figures 11, 12, 13:
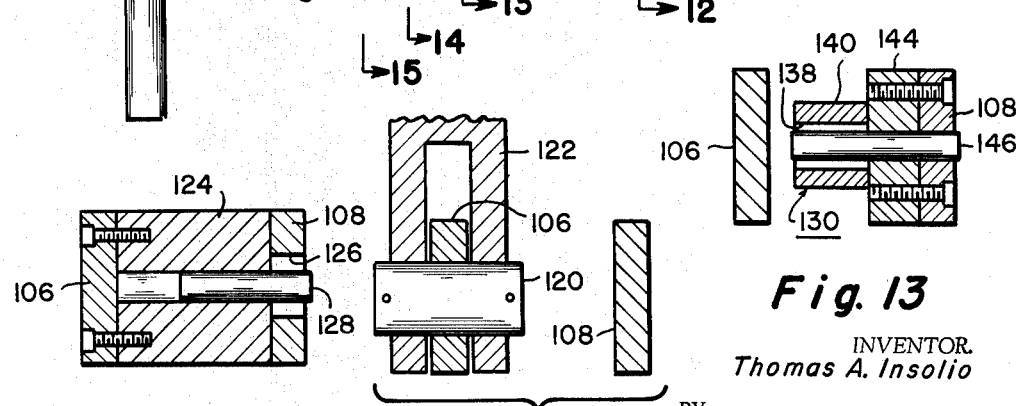
FIGURE 11 is a view in section taken along the line 11—11 of FIGURE 10.
FIGURE 12 is a view in section taken along the line 12—12 of FIGURE 10 illustrating the connection between one of the control arms and the power actuating means.
FIGURE 13 is a view in section taken along the line 13—13 of FIGURE 10 illustrating the connection between one of the control arms and the link.

Referring to the drawings and particularly to FIGURES 1, 2 and 3, there is illustrated a drawing pit containing molten glass G which is fed from a canal 10 to the drawing pit 12. A debiteuse 14 is provided in the drawing pit 12 and the molten glass is drawn in the usual manner upwardly through slot 16 in the debiteuse and through the drawing pit 12 into the vertically extending lehr 18. The lehr 18 has a plurality of rolls, first rolls 20 and 22 being the only rolls illustrated in FIGURES 1 and 2. FIGURE 2 illustrates a pair of stabilizers 24 having stabilizer wheels 26 which maintain a predetermined lateral dimension of the glass sheet as it is being drawn vertically through the cooling lehr. A pair of sensing devices 28 and 30 are positioned within the drawing pit 12 and serve to sense malfunctions in the drawing operation.

Figure 17:
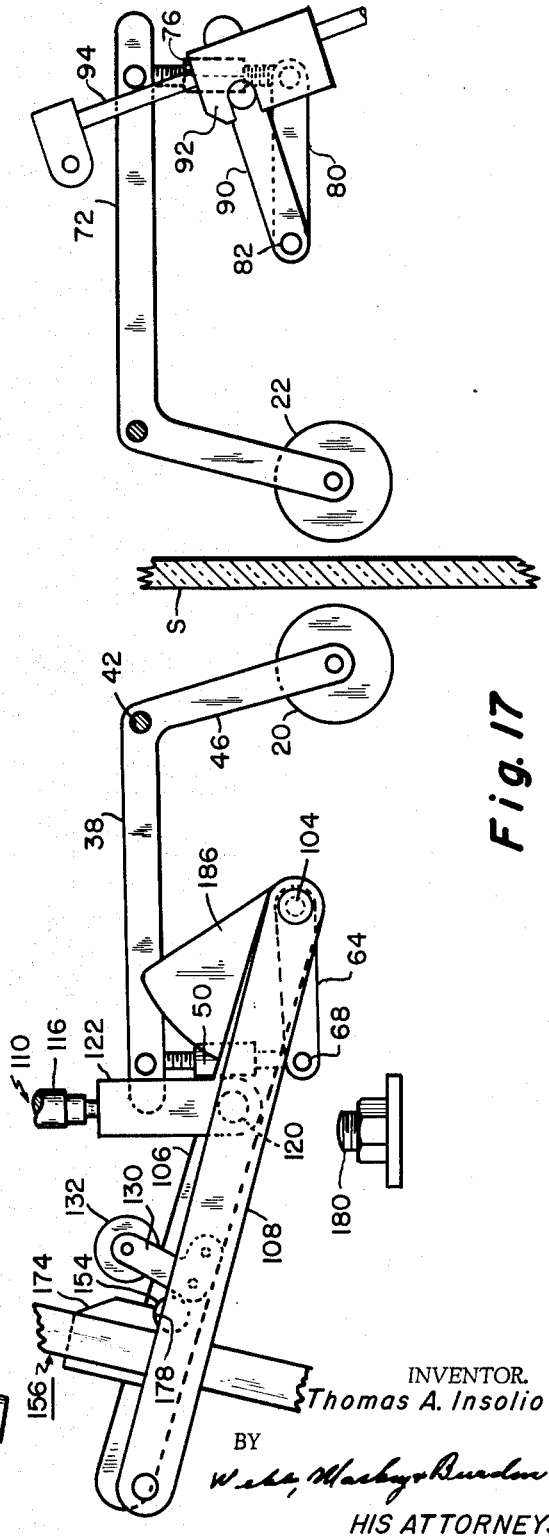
FIGURE 17 is a view similar to FIGURE 16 illustrating the rolls and my control device in a normal operating position with the rolls spaced a predetermined distance from the glass sheet.

Referring to FIGURE 3, first rolls 20 and 22 are illustrated. Roll 20 is nonrotatably supported on shaft 32 and roll 22 is nonrotatably supported on shaft 34. Drive means (not shown) rotate shafts 32 and 34 at a predetermined speed. Roll 20 is supported by a pair of L shaped levers 36 and 38 which are pivotally mounted at 40 and 42. Shaft 32 is carried in the depending portion 44 of lever 36 at one end and in the depending portion 46 of lever 38 at the other end. A pair of turnbuckles 48 and 50 are connected at one end to the elongated horizontal arm 52 of lever 36 and the elongated horizontal arm 54 of lever 38 adjacent the respective end portions of the arms 52 and 54. A control shaft 56 is rotatably supported by supports 58 and 60. The control shaft 56 has arms 62 and 64 extending rearwardly therefrom and connected at 66 and 68 to the other ends of turnbuckles 48 and 50. The arms 62 and 64 are fixed to the control shaft 56 so that rotation of control shaft 56 in a counterclockwise direction causes downward movement of arms 62 and 64 and hence downward movement of levers 36 and 38 to move roll 20 toward roll 22. The shaft 34 carrying roll 22 is similarly supported by L shaped levers 70 and 72, and turnbuckles 74 and 76 connect the levers 70 and 72 to arms 78 and 80. A control shaft 82 is rotatably supported by supports 84 and 86 and is fixed to arms 78 and 80 so that rotation of shaft 82 in a clockwise direction will move roll 22 toward roll 20. Both control shafts 56 and 82 have end portions which extend beyond the front walls at the base of the cooling lehr. The roll 20 is the primary roll which is arranged to move toward the sheet of glass and urge the sheet of glass against roll 22. However, during the start-up when the bait is lowered down the lehr into the drawing pit, both rolls 20 and 22 are moved away from each other a substantial distance so that the bait and bulb of glass can pass therebetween. During operation when a continuous sheet of glass is being drawn upwardly through the cooling lehr, the roll 22 remains fixed by mechanism to be later described. The roll 20 is maintained at a spaced distance from roll 22 during the normal glass drawing operation, as illustrated in FIGURE 17. When the closing of the rolls is desired, the roll 20 will move toward roll 22 so that both rolls 20 and 22 contact the glass sheet and propel the same upwardly.

The roll 22 may be moved outwardly away from the center line of the sheet of glass by means of a positioning device illustrated in FIGURE 3. The end of control shaft 82 which extends through plate 88 has another arm 90 fixed thereto. The arm 90 has an outwardly extending roller 92 secured thereon. A rod 94 is pivotally secured to plate 88 at one end and has a holding block 96 slidably positioned thereon. An adjusting handle 98 extends from the lower portion of rod 94 and is arranged to threadably move the block 96 on rod 94. The block 96 has a slot 100 into which roller 92 extends to prevent rotation of arm 90 and control shaft 82. Since the rotational movement of arm 90 in a counterclockwise direction moves the roll 22 away from roll 20 and the clockwise rotation of arm 90 moves roll 22 toward roll 20, the adjustment of block 96 on rod 94 with roller 92 of arm 90 positioned therein regulates or establishes the position of roller 22 relative to roller 20. During the start-up operation, block 96 on rod 94 is rotated in a counterclockwise direction to disengage roller 92 from slot 100 to thereby release arm 90 from position control of rod 94. In this manner arm 90 can be rotated counterclockwise to move roll 22 a substantial distance away from roll 20 during the start-up operation so that the roll 22 will not interfere with the bait and the large bulb of glass as it passes between rolls 20 and 22. Under normal operating conditions, however, the roller 92 is positioned within the slot 100 of block 96 and the relative position of roller 22 with respect to roll 20 is obtained by adjusting, by means of handle 98, the relative position of block 96 on rod 94.

The primary roll 20 is controlled by my control device illustrated in detail in FIGURES 3 and 6 through 15. The control shaft 56 has an end extending through plate 102 and has an end portion 104. The control shaft 56 is rotatable relative to plate 102. A pair of control arms 106 and 108 are positioned on control shaft 56 adjacent the end portion 104. Control arm 106 is freely rotatable relative to control shaft 56 and control arm 108 is fixed to control shaft 56 and is rotatable therewith. A power means 110 is pivotally secured to the plate 102 at 118 and includes a cylinder 112 with a piston 114 positioned therein and a piston rod 116 extending outwardly beyond the cylinder. The end of piston rod 116 is pivotally secured at 120 to control arm 106 by a clevis 122. Suitable inlet and outlet means are provided for the cylinder 112 to permit fluid under pressure to enter above or below the piston 114. The inlet and outlet means are not shown. Control arm 106 (see FIGURES 9, 10 and 11) has a block 124 secured thereto and positioned between control arms 106 and 108. Control arm 108 has a vertical slot 126 and a pin 128 is secured to block 124 and extends into slot 126. Thus, if control arm 106 moves a predetermined distance, either upwardly or downwardly, under forces exerted by power means 110, the pin 128 will engage an end of slot 126 and move control arm 108 with control arm 106. The movement of control arm 108, because of its rigid connection to control shaft 56, moves primary roll 20.

An L shaped link 130 has a roller wheel 132 secured to the free end portion of leg 134 by means of pin 136. The wheel 132 is freely rotatable on pin 136 relative to link 130 and acts as a release in a manner described hereinafter. The link 130 has an elongated aperture 138 adjacent the end portion of other leg 140 (see FIGURE 13). The link 130 has another aperture 142 intermediate its end portions (see FIGURE 14). Control arm 108 has a boss 144 secured to its inner surface and a pin 146 is secured to both the boss 144 and control arm 108. The pin extends through elongated aperture 138 in leg 140 of link 130 so that link 130 is freely rotatable on pin 146. Control arm 106 has a threaded aperture 148 and bolt 150 extends through aperture 142 in link 130 and is threadedly secured in aperture 148 of control arm 106. A cylindrical spacer 152 is positioned between link 130 and control arm 106.

With this arrangement control arms 106 and 108 are connected to each other and movement of one control arm relative to the other changes the relative position of link 130. Control arm 106 has a cam follower 154 secured thereto adjacent link 130 (see FIGURES 6, 10 and 15).

A roll position control member 156 is pivotally secured at one end to plate 102 at 158. The position control member 156 has a pair of parallel spaced side members 160 and 162 (FIGURE 5) which are maintained in spaced relation by a block 164 adjacent their lower portion. A threaded shaft 166 is rotatably secured between parallel spaced side members 160 and 162 by means of blocks 168 and 164. The threaded shaft 166 has a lower end portion 170 which extends through an aperture in block 164 and is secured to a handle 172. A cam-like block 174 has a threaded bore 176 therein. The threaded shaft 166 extends through block 174 in threaded engagement with bore 176 in a manner that rotation of handle 172 moves the block 174 longitudinally relative to the side members 160 and 162. The block 174 has a curved indented portion 178 extending laterally therefrom. The cam follower 154 which is secured to control arm 108 is arranged to be positioned in the curved indentation 178. This arrangement of the indented portion of block 174 and cam follower 154 limits the clockwise rotation of control arm 108. Through link 130 the clockwise rotation of control arm 106 as viewed in FIGURE 6 is also limited by limiting the movement of control arm 108. The relative spacing between the rolls is thus adjusted by means of rotation of handle 172 on roll position control member 156 to move the block 174 longitudinally and thus fix the position of control arm 106 when an upward force is exerted thereon by power means 110.

A bolt 180 is threadedly secured in an angular plate 182 which in turn is secured to plate 102. The bolt 180 is arranged to limit the counterclockwise rotation of control arms 106 and 108 to limit the distance the rolls move when they are closed. It is preferable to adjust bolt 180 so that when control arm 106 abuts the top portion of bolt 180, the rolls 20 and 22 touch each other without a sheet of glass therebetween. Also secured in spaced relation to the side members 160 and 162 is an additional elongated strap 184 which is spaced from the side member 160 and provides a guideway for control arm 106 so that the block 174 associated with roll position member 156 and cam follower 154 associated with control arm 106 are properly positioned relative to each other. The control arm 106 has a pie shaped portion 186 to which is secured an outwardly extending member 188. An adjustable switch actuator 190 is adjustably secured in the member 188 and is arranged to actuate a limit switch LS2. The pie shaped portion 186 is arranged to actuate a second limit switch LS1 depending on movement of control arm 106 in a clockwise direction a predetermined distance.

*Operation*

Figure 16:
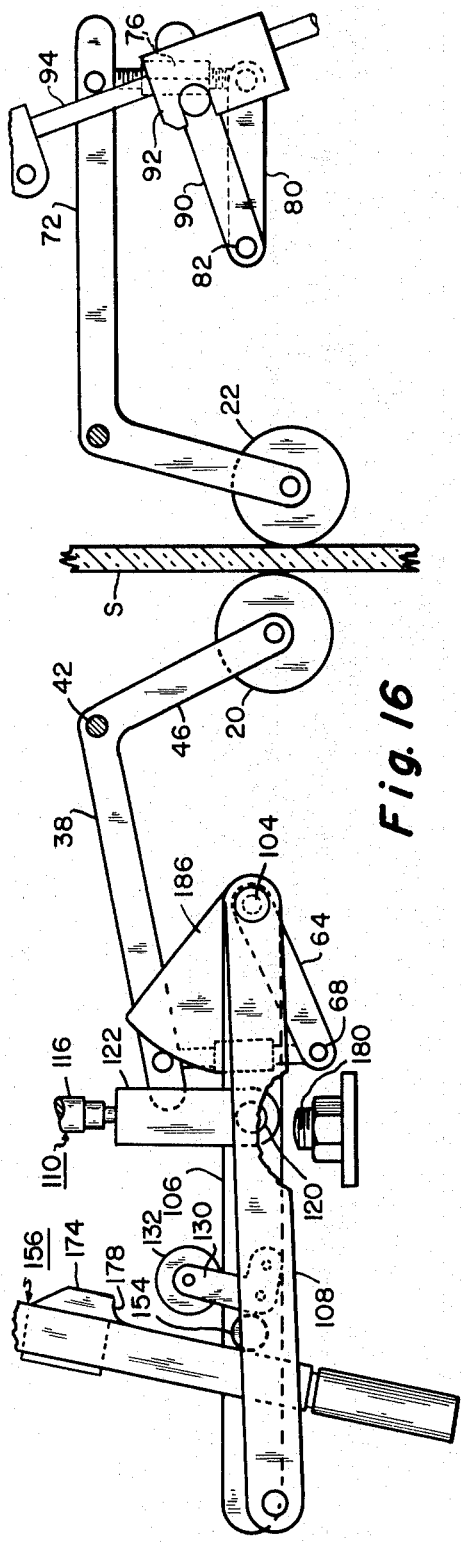
FIGURE 16 is a semischematic illustration of my control mechanism with the rolls in the closed position.

Operation of the control device is best illustrated in schematic FIGURES 16, 17, 18 and the perspective view in FIGURE 3. FIGURE 17 illustrates my control device in a normal roll open position. This is the desired position of rolls 20 and 22 relative to a sheet of glass S being drawn vertically therebetween. The relative distance between the face of the sheet of glass S and either roll 20 or 22 is ⅛ inch or less. This minimizes the chimney or stack effect previously discussed in vertical lehr 18. In the normal operating position with rolls 20 and 22 open, there is an upward force exerted on control arm 106 by the power means 110. The cam follower 154 secured to control arm 106 abuts the curved semicircular indentation 178 of block 174 on roll positioning member 156 to thus maintain the fixed open position of roll 20 relative to the sheet of glass S. The spacing of the roll 20 from the sheet of glass S is adjusted by means of handle 172 which moves the block 174 on position control member 156. The roll 22 is adjusted by means of handle 98 on rod 94 (FIGURE 3). Thus, the relative position of both rolls 20 and 22 is preset by means of the above described adjusting means for block 174. The roll 20 is maintained in spaced relation to the sheet of vertically moving glass S by means of the upward force exerted by power means 110 on control arm 106. It should be noted that control arm 106 is rotatable relative to control shaft 56 and does not thereby directly control the position of roll 20. The position of roll 20 is controlled through the relative position of control arm 108 to control arm 106. As illustrated in FIGURE 17, the control arm 108, which is rigidly secured to and rotatable with control shaft 56, is maintained in a predetermined position by means of link 130.

If, by means of a sensing device such as that illustrated and described in a copending application entitled "Position Sensing Device," of which I am a coinventor, a malfunction is detected, the power means 110 exerts a downward force on piston 114 and piston rod 116 to thereby urge control arm 106 downwardly under the force of power means 110 to move the control arm 106 in a counterclockwise direction as viewed in FIGURE 16. The link 130 urges control arm 108 downwardly and rotates control arm 108 in a counterclockwise direction to pivot roll 20 through L shaped levers 36 and 38 toward the sheet of glass S. As previously discussed, roll 22 remains in a fixed position and the sheet of glass by means of roll 20 is moved into abutting relation with roll 22. The rolls 20 and 22 are maintained in closed relation against the glass sheet and serve to propel the glass sheet upwardly in the lehr 18. The rolls 20 and 22 are kept in abutting relation with the sheet of glass S until the malfunction has been corrected and at that time the rolls are again opened and maintained in fixed position as illustrated in FIGURE 17. Suitable control means can also be provided so that if the malfunction is cleared, the downward force exerted by power means 110 can be released and the rolls permitted to remain in abutting relation with the glass sheet, not by a positive pressure of the power actuating means 110, but by their own weight.

There must be provided, however, a means to permit the roll 20 to move away from roll 22 when a stone or other impurity increases the thickness of the glass sheet S. During normal operation, the power means 110 urges the rolls toward an open position and the distance the rolls may be opened is limited by means of the contact between cam follower 154 and block 174 as previously discussed. When a stone or other impurity passes between rolls 20 and 22 to increase the thickness of the glass sheet, roll 20 is urged away from its previous position relative to a sheet of glass of normal thickness. The clockwise movement of roll 20 as it is moved by the impurity is transmitted through L shaped levers 36 and 38, turnbuckles 48 and 50 and arms 62 and 64, to control shaft 56 to thereby control shaft 56 in a clockwise direction (FIGURE 18). Control arm 108 being fixed to control shaft 56 also rotates in a clockwise direction. The link 130 pivots relative to control arms 106 and 108 in a counterclockwise direction and wheel 132 urges roll position control member 156 through block 174 in a clockwise direction so that block 174 is moved away from cam follower 154 and both control arms 106 and 108 are free to rotate to a maximum position. As illustrated in FIGURE 4, when control arm 106 rotates in a clockwise direction a predetermined distance above the position therein illustrated, limit switch LS1 which is normally tripped is released to provide a signal that a stone or other impurity is present in the sheet of glass. Control arm 106 also trips limit switch LS2 to cut off all power to the power means 110. The roll 20 then moves by its own weight against the glass sheet and remains against the glass sheet until manually opened by the operator. In the event that there is a power failure or a loss of pressure in the power means 110, my control device has a fail-safe arrangement wherein the rolls will close of their own weight and remain in abutting relation with the glass sheet until the power is again restored and the rolls opened.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically ilustrated and described.

I claim:
1. In an apparatus for vertically drawing a glass sheet:
(A) a primary roll;
(B) a secondary roll;
(C) rotatable lever means supporting said primary roll for movement relative to said secondary roll;
(D) control means for said lever means to rotate said lever means and thereby move said primary roll relative to said secondary roll; said control means including
  (1) power means for normally rotating said lever means in a direction to move said primary roll away from said secondary roll,
  (2) rotatable coupling means attached to said lever means and to said power means whereby said power means rotates said lever means, and
  (3) stop means limiting the rotation of said coupling means and thereby limiting the rotation of said lever means to position said primary roll a predetermined distance from said secondary roll, said coupling means including
    (a) a release member responsive to a force exerted between said rolls for disengaging said stop means to permit further rotation of said coupling means and said lever means to thereby permit said primary roll to move away from said secondary roll when a force is exerted between said rolls, and
    (b) actuator means to shut off said power means after said release member disengages said stop means.

2. In an apparatus for vertically drawing a glass sheet:
(A) a primary roll;
(B) a secondary roll;
(C) rotatable lever means supporting said primary roll for movement relative to said secondary roll;
(D) control means for said lever means to rotate said lever means and thereby move said primary roll relative to said secondary roll; said control means including
  (1) power means for normally rotating said lever means in a direction to move said primary roll away from said secondary roll,
  (2) a rotatable control shaft fixed to said lever means,
  (3) a first control arm rotatable about said control shaft and conected to said power means for rotation thereby,
  (4) a second control arm spaced from said first control arm and fixed to said control shaft for rotation therewith,
  (5) a link means connecting said first and second control arms,
  (6) stop means limiting the rotation of said control arms by said power means to thereby stop rotation of said lever means to position said primary roll a predetermined distance from said secondary roll; said link means including a release member responsive to a force exerted between said rolls for disengaging said stop means to permit further rotation of said control arms and said lever means to thereby permit said primary roll to move away from said secondary roll when a force is exerted between said rolls.

3. In an apparatus as set forth in claim 2; said stop means including:
(1) a cam member mounted on said first control arm,
(2) a pivotally mounted roll position member, and
(3) a block adjustably supported on said roll position member and being formed with an indent overlying said cam member, said indent contacting said cam member to stop rotation of said control arms by said power means at a predetermined position to thereby stop rotation of said lever means with said primary roll spaced a predetermined distance from said secondary roll.

4. In an apparatus as set forth in claim 3; said link means having
(1) a first leg lying between said spaced control arms, and
(2) a second leg perpendicular to said first leg and having a free and extending outwardly from between said control arms; the free end of said second leg forming said release member aligned with said block whereby a predetermined rotation of said control arms rotates said link means and forces said release member into contact with said block to disengage said block from cam member to permit further rotation of said control arms.

5. In an apparatus as set forth in claim 2; said link means having
(1) a first leg lying between said spaced control arms and having an elongated aperture formed therein,
(2) a second leg perpendicular to said first leg and having a free end extending outwardly from between said control arms forming said release member,
(3) a pivot pin connecting said legs to said first control arm, and
(4) a fixed pin attached to said second control arm and extending into the elongated aperture in the first leg of said link means, whereby said second leg is pivoted about said pivot pin when rotation of said second control arm causes said fixed pin to abut an end of the elongated slot in said first leg.

6. In an apparatus as set forth in claim 1:
(E) rotatable lever means supporting said secondary roll for movement relative to said primary roll;
(F) control means for said lever means for said secondary roll to rotate said lever means and thereby move said secondary roll relative to said primary roll; said control means for said secondary roll including (1) a second rotatable control shaft fixed to said support means for said secondary roll to rotate said support means,
(2) an arm fixed to said second control shaft and having a free end, and
(3) an adjustable holding block releasably detaining the free end of said arm.

References Cited by the Examiner

UNITED STATES PATENTS

| | | | |
|---|---|---|---|
| 1,795,254 | 3/1931 | Escole | 65—193 |
| 2,300,522 | 11/1942 | Redshaw | 65—194 |
| 2,972,210 | 2/1961 | Broman et al. | 65—29 |

FOREIGN PATENTS

| | | |
|---|---|---|
| 668,505 | 5/1928 | France. |
| 682,888 | 10/1929 | France |
| 371,178 | 2/1939 | Italy. |
| 176,590 | 9/1961 | Sweden. |

DONALL H. SYLVESTER, *Primary Examiner.*

UNITED STATES PATENT OFFICE
CERTIFICATE OF CORRECTION

Patent No. 3,222,156                          December 7, 1965

Thomas A. Insolio

It is hereby certified that error appears in the above numbered patent requiring correction and that the said Letters Patent should read as corrected below.

Column 7, line 5, after "thereby" insert -- rotate --; column 8, line 45, for "and" read -- end --; line 51, after "from" insert -- said --.

Signed and sealed this 20th day of September 1966.

(SEAL)
Attest:

ERNEST W. SWIDER                          EDWARD J. BRENNER
Attesting Officer                              Commissioner of Patents